US 9,494,990 B2

(12) United States Patent
Murata

(10) Patent No.: US 9,494,990 B2
(45) Date of Patent: Nov. 15, 2016

(54) DEVICE, METHOD, AND COMPUTER PROGRAM PRODUCT FOR COMPUTING ELECTRIC POWER CONSUMPTION

(75) Inventor: Jun Murata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 462 days.

(21) Appl. No.: 12/659,108

(22) Filed: Feb. 25, 2010

(65) Prior Publication Data
US 2010/0235656 A1 Sep. 16, 2010

(30) Foreign Application Priority Data

Mar. 13, 2009 (JP) .................................. 2009-062051

(51) Int. Cl.
G06F 1/00 (2006.01)
G06F 1/28 (2006.01)
G06F 1/32 (2006.01)

(52) U.S. Cl.
CPC ............... G06F 1/28 (2013.01); G06F 1/3203 (2013.01)

(58) Field of Classification Search
USPC ................. 713/300, 310, 320–324, 330, 340
See application file for complete search history.

(56) References Cited

U.S. PATENT DOCUMENTS

| 6,795,829 | B2 * | 9/2004 | Alsop et al. | |
| 7,517,162 | B2 * | 4/2009 | Aizawa | 400/62 |
| 8,126,351 | B2 * | 2/2012 | Ishizuka | B41J 3/46 399/88 |
| 2002/0144162 | A1 * | 10/2002 | Tada et al. | 713/300 |
| 2002/0152184 | A1 * | 10/2002 | Katsuda | 705/400 |
| 2004/0148529 | A1 * | 7/2004 | Cantwell | 713/300 |
| 2008/0235624 | A1 | 9/2008 | Murata | |
| 2009/0055673 | A1 * | 2/2009 | Kitajima | 713/340 |
| 2009/0110427 | A1 * | 4/2009 | Ishizuka | 399/88 |
| 2009/0142089 | A1 * | 6/2009 | Kouno | 399/79 |

FOREIGN PATENT DOCUMENTS

| JP | 11-212743 | 8/1999 |
| JP | 2005-053122 | 3/2005 |
| JP | 2006-317355 | 11/2006 |
| JP | 2007-001080 | 1/2007 |

OTHER PUBLICATIONS

Japanese Office Action dated Feb. 19, 2013 for related Japanese Application JP 2009-062051.
Japanese Office Action dated Aug. 20, 2014 for JP Application No. 2013-133449, http://ascii.jp/elem/000/000/189/189771/, dated Nov. 17, 2008.

* cited by examiner

Primary Examiner — Fahmida Rahman
(74) Attorney, Agent, or Firm — Harness, Dickey & Pierce, P.L.C.

(57) ABSTRACT

A disclosed electric power consumption computation device includes an acquisition unit configured to acquire apparatus information from an apparatus connected to the electric power consumption computation device via a predetermined data communication path, and a computation unit configured to compute electric power consumption of the apparatus based on information on a number of output sheets output by the apparatus contained in the apparatus information acquired by the acquisition unit and a TEC value of the apparatus.

18 Claims, 9 Drawing Sheets

FIG.4A

| MODEL IDENTIFICATION INFORMATION | TEC VALUE (kW/h) | IPM VALUE |
|---|---|---|
| MFP01 | 10.1 | 30 |
| MFP02 | 12.3 | 50 |
| ..... | ..... | ..... |
| PRN01 | 7.8 | 25 |
| PRN02 | 5.6 | 20 |
| ..... | ..... | ..... |

| | APPARATUS IDENTIFICATION INFORMATION | ELECTRIC POWER CONSUMPTION RATIO (%) | | | | |
|---|---|---|---|---|---|---|
| | | MONDAY | TUESDAY | WEDNESDAY | THURSDAY | FRIDAY |
| PATTERN 1 | M1, M2 | 20 | 10 | 10 | 20 | 40 |
| PATTERN 2 | M5, P1, P2 | 10 | 20 | 20 | 20 | 30 |
| ...... | ...... | ...... | ...... | ...... | ...... | ...... |

32

DEVICE, METHOD, AND COMPUTER PROGRAM PRODUCT FOR COMPUTING ELECTRIC POWER CONSUMPTION

BACKGROUND OF THE INVENTION

1. Field of the Invention

The disclosures relate to a device for computing electric energy consumption, and more specifically relate to a technology to compute electric power consumption of devices and apparatuses without attaching electric power consumption measuring devices to the devices and apparatuses.

2. Description of the Related Art

Japanese Patent Application Laid-Open Publication No. 2005-53122, for example, discloses a system capable of decreasing adverse effects of image forming apparatuses and servers mutually connected via a network on an ambient environment by coordinating energy conservation operations of the image forming apparatuses and servers.

Recently, public interest has been increasingly drawn to environmentally oriented or conservationally oriented multi-functional peripherals (MFP: hereinafter also called "apparatus") such as environmentally-friendly printers or copiers, and hence, apparatuses that exhibit low power consumption are preferred in the marketplace.

Electric power consumption of apparatuses of major manufacturers is disclosed by a predetermined organization (e.g., the Energy Conservation Center), based on which some users may make procurement decisions of apparatuses. Further, even after the procurement, some users (companies) are interested in how much electric power is consumed by the apparatuses in their own offices in order to reduce energy consumption and cost.

The electric power consumption of the apparatuses is measured by connecting electric power meters to the apparatuses in the actual environment, except for those of tenants in which the electric power of an entire office is controlled by the central control system.

However, in a case where an office has numerous apparatuses, it is cumbersome to attach the electric power meters to all the apparatuses; moreover, it is not feasible to do so in terms of cost efficiency.

SUMMARY OF THE INVENTION

Accordingly, embodiments of the present invention may provide a novel and useful device, method, and computer program product for computing electric power consumption solving one or more of the problems discussed above.

According to an embodiment of the invention there is provided an electric power consumption computation device that includes an acquisition unit configured to acquire apparatus information from an apparatus connected to the electric power consumption computation device via a predetermined data communication path; and a computation unit configured to compute electric power consumption of the apparatus based on information on a number of output sheets output by the apparatus contained in the apparatus information acquired by the acquisition unit and a TEC value of the apparatus.

According to an embodiment of the invention there is provided a method for computing electric power consumption in an electric power consumption computation device. The method includes acquiring apparatus information from an apparatus connected to the electric power consumption computation device via a predetermined data communication path; and computing electric power consumption of the apparatus based on information on a number of output sheets contained in the apparatus information acquired from the apparatus and a TEC value of the apparatus.

According to an embodiment of the invention there is provided a computer-readable recording medium containing a computer program for causing a computer to execute a function for computing electric power consumption in an electric power consumption computation device. The function includes acquiring apparatus information from an image forming apparatus connected to the electric power consumption computation device via a predetermined data communication path; and computing electric power consumption of the image forming apparatus based on information on a number of output sheets contained in the apparatus information acquired from the image forming apparatus and a TEC value of the image forming apparatus.

Additional objects and advantages of the embodiments will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

FIGS. 4A and 4B are tables illustrating examples of data for computation according to the first embodiment;

DETAILED DESCRIPTION OF THE PREFERRED EMBODIMENTS

A description is given below, with reference to the FIGS. 1 through 8 of embodiments of the present invention. Preferred embodiments are described below, with reference to accompanying drawings.

First Embodiment

<Operations Environment>

A configuration of a system according to a first embodiment is described.

Figure 1:
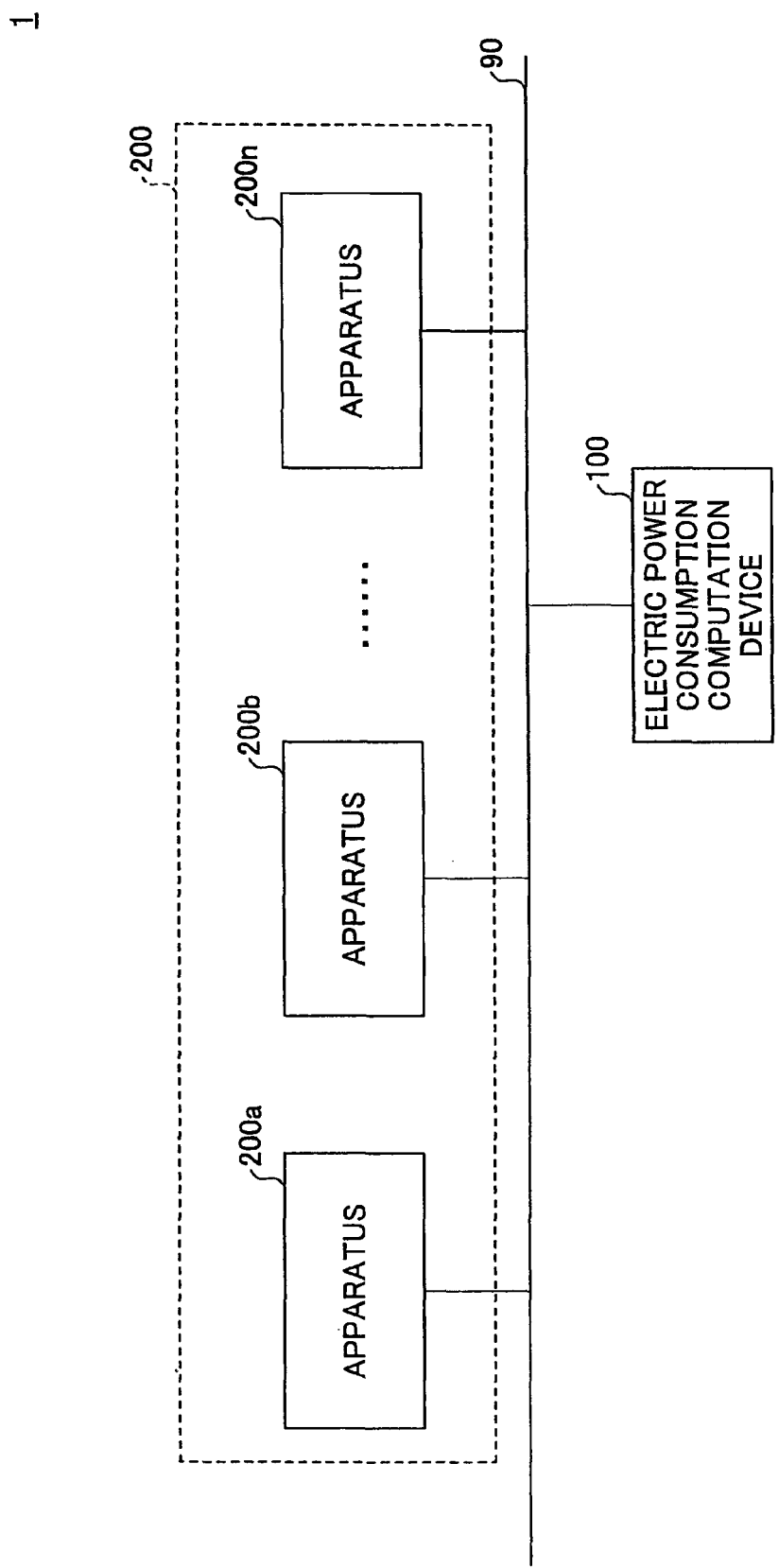
FIG. 1 is a diagram illustrating a first operations environment example of an electric power consumption computation device according to a first embodiment.

FIG. 1 is a diagram illustrating a first example of an operations environment of an electric power consumption computation device 100 according to the first embodiment. FIG. 1 illustrates an example of a system 1 for computing (estimating) electric power consumption (hereinafter referred to as "electric power consumption computation system") of apparatuses 200. In the electric power consumption computation system 1, the electric power consumption computation device 100 is connected to one or more apparatuses 200 via an internal network 90 (regardless of wired or wireless).

These apparatuses include image forming apparatuses such as a printer, a scanner, a facsimile machine, or a multifunctional peripheral (MFP) formed by incorporating two or more of such functions in one enclosure.

With such a system configuration, the electric power consumption computation device 100 computes (estimates) electric power consumption of each of the apparatuses 200a through 200n by acquiring apparatus information from the corresponding apparatuses 200a through 200n.

<Hardware Configuration>

Next, a hardware configuration of the electric power consumption computation device 100 is described.

Figure 2:
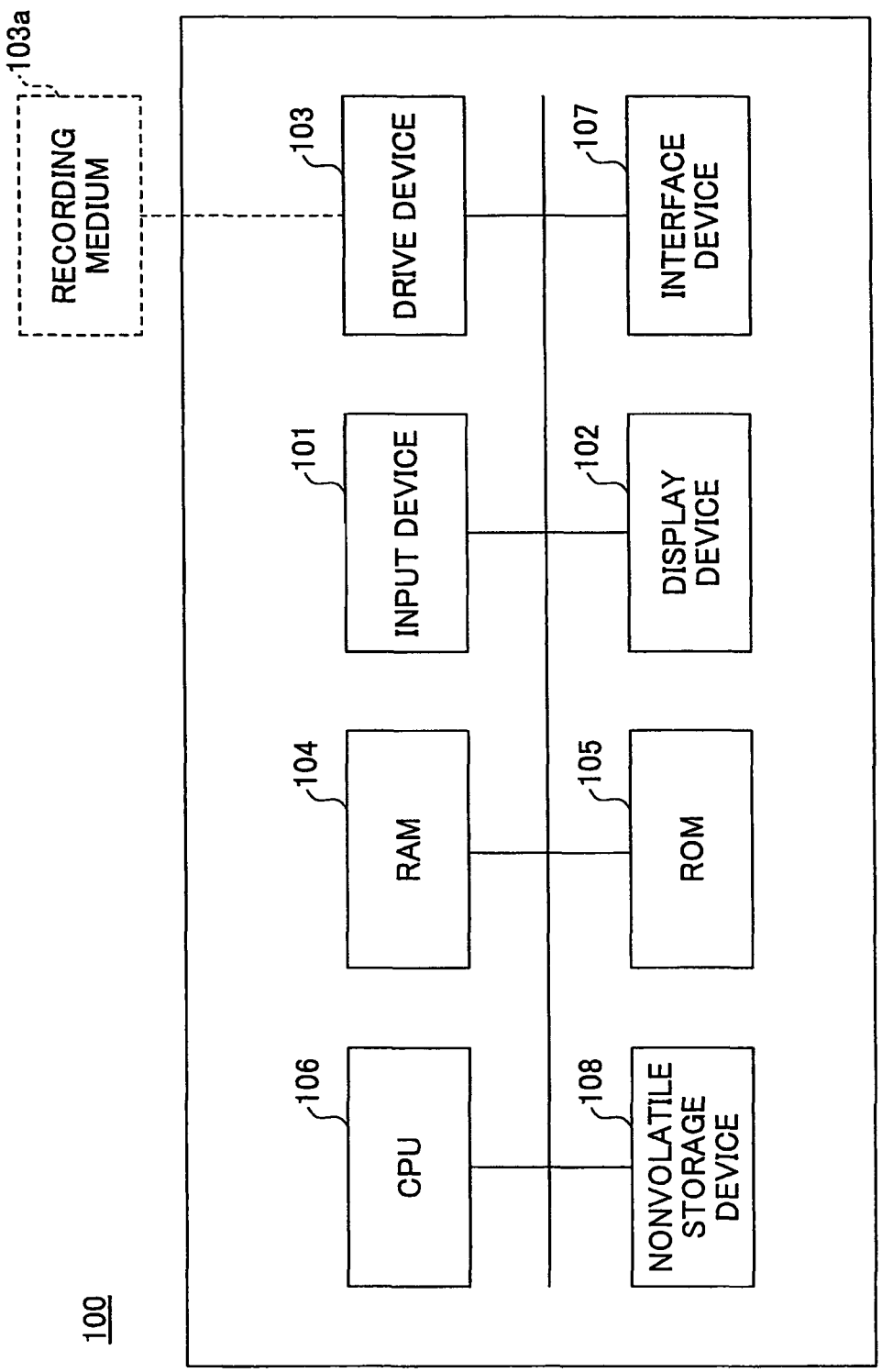
FIG. 2 is a diagram illustrating a hardware configuration example of the electric power consumption computation device according to the first embodiment.

FIG. 2 is a diagram illustrating a hardware configuration example of the electric power consumption computation device 100 according to the first embodiment. As illustrated in FIG. 2, the electric power consumption computation device 100 includes an input device 101, a display device 102, a drive device 103, a random access memory (RAM) 104, a read only memory (ROM) 105, a CPU 106, an interface 107, and a hard disk drive (HDD) 108, which are interconnected via a bus.

The input device 101 includes a keyboard and a mouse that can input various operations signals to the electric power consumption computation device 100. The display device 102 includes a display that displays processing results such as a computational result (estimation) output by the electric power consumption computation device 100.

The interface device 107 is provided as an interface function to connect the electric power consumption computation device 100 to a predetermined data transmission path such as a network. The electric power consumption computation device 100 is thus capable of carrying out data communication with apparatuses 200 via the interface device 107.

The HDD 108 is a nonvolatile storage device that stores various types of programs and data. Examples of such programs and data stored in the HDD 108 include basic software of information processing systems such as "Windows (registered trade mark)" or "Unix (registered trade mark)". That is, an operating system or OS that controls the entire electric power consumption computation device 100. The HDD 108 manages the stored programs and data with a prescribed file system and/or database (DB).

The drive device 103 is provided as an interface between the electric power consumption computation device 100 and a removable recording medium 103a. Accordingly, the electric power consumption computation device 100 is capable of reading the programs and data from and/or writing those to the recording medium 103a via the drive device 103.

The ROM 105 is a nonvolatile semiconductor memory (nonvolatile storage device) capable of retaining internal data after the power is switched off. The ROM 105 stores data on a basic input-output system (BIOS) executed at startup of the electric power consumption computation device 100, system settings of the electric power consumption computation device 100, and network related settings.

The RAM 104 is a volatile semiconductor memory (volatile storage device) that temporarily stores the programs or data retrieved from the nonvolatile storage device. The CPU 106 controls the entire electric power consumption computation device 100 or activates various functions installed in the electric power consumption computation device 100 by executing the programs loaded in the RAM 104.

The electric power consumption computation device 100 having such a hardware configuration can implement an electric power consumption computational function by causing the CPU 106 to execute the programs (electric power consumption computational program) retrieved from the HDD 108 and loaded in the RAM 104.

<Electric Power Consumption Computational Function>

Next, the electric power consumption computational function is described.

The electric power consumption computation device 100 according to the first embodiment includes an electric power consumption computational function that computes electric power consumption of each of the apparatuses 200a through 200n of a desired day of the week based on a TEC (Typical Electricity Consumption) value of the corresponding apparatuses 200a through 200n and the number of sheets printed by the corresponding apparatuses 200a through 200n per week.

The TEC value is computed based on the measurement method determined by the international ENERGY STAR program. For example, a TEC of an image forming apparatus is computed by summing a measurement value of electric power consumption during running hours and sleep/off mode hours of the image forming apparatus for five working days and a measurement value of electric power consumption during sleep/off mode hours of the image forming apparatus for two non-working days.

As described above, the TEC value is given in kW/h, which is computed based on a model, specification, and electric power consumption of a typical office apparatus used in a typical office in one week. The computational results of TEC values are disclosed by a predetermined organization, and therefore, a TEC value is already provided for each of the apparatuses 200a through 200n or each model of the apparatuses 200a through 200n used in this embodiment.

In the first embodiment, electric power consumption is estimated based on such a given TEC value of the apparatuses 200a through 200n. As described above, since the TEC value is computed based on an assumption of the typical office apparatus usage in the typical office in one week, various parameter values of the apparatus for computation are is provided per week.

In this manner, the electric power consumption computation device 100 can compute electric power consumption of the apparatuses 200a through 200n without using an electric power meter. Since TEC values of the apparatuses 200a through 200n produced by major manufacturer are already disclosed, electric power consumption of various apparatuses produced by different manufactures situated in the same office environment can be computed by the same computational method. That is, the method for computing electric power consumption according to the first embodiment can be flexibly used in various apparatuses 200a through 200n in the same office environment.

<Functional Configuration>

Figure 3:
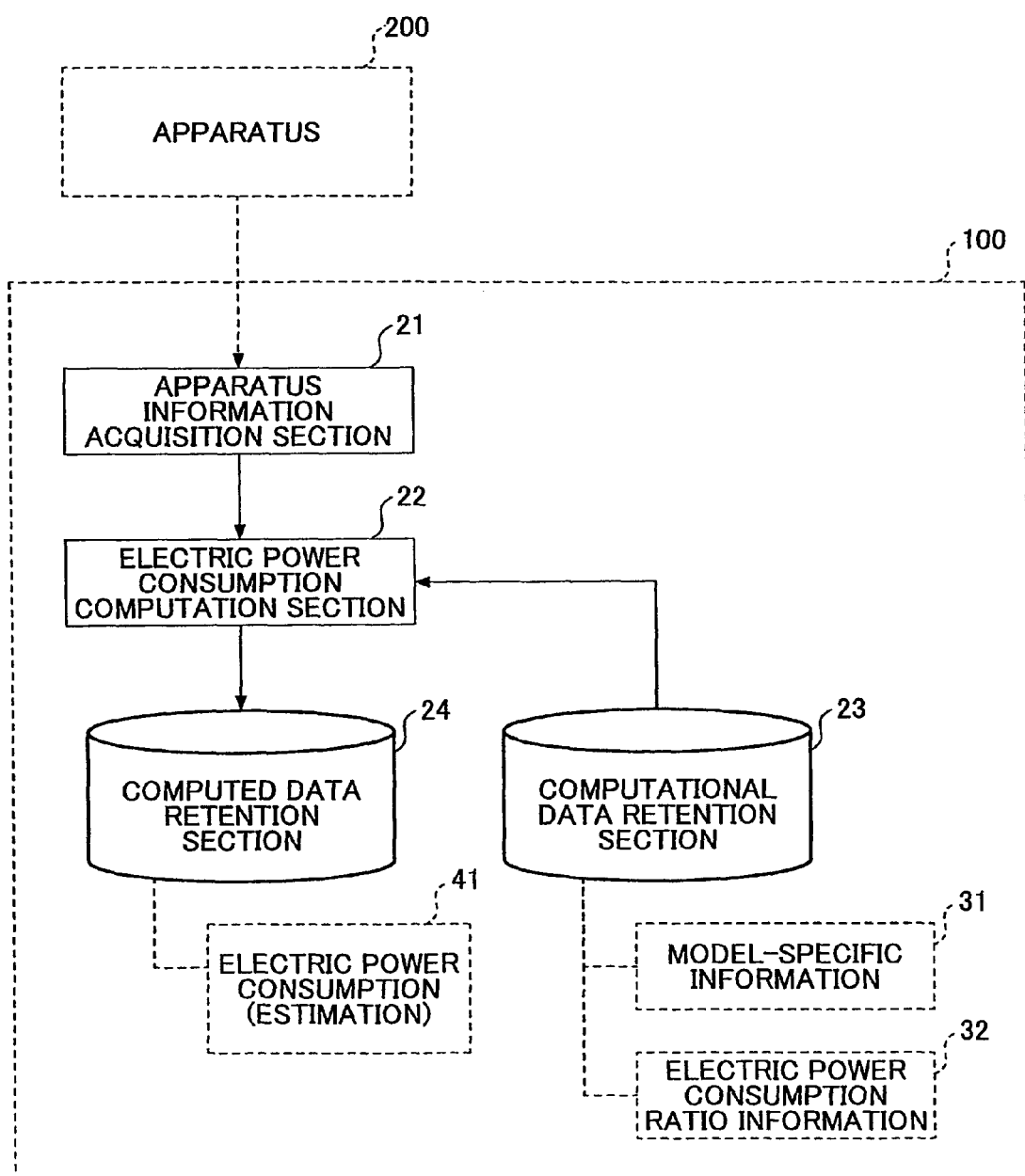
FIG. 3 is a diagram illustrating a functional configuration example of the electric power consumption computation device according to the first embodiment.

FIG. 3 is a diagram illustrating a functional configuration example of the electric power consumption computation device 100 according to the first embodiment.

As illustrated in FIG. 3, the electric power consumption computation device 100 includes an apparatus information acquisition section 21, an electric power consumption computation section 22, and data retention sections 23 and 24 that retain various types of data.

The apparatus information acquisition section 21 is a functional section that acquires apparatus information from the apparatuses 200a through 200n. The apparatus information acquisition section 21 transmits an information acquisition request to the apparatuses 200a through 200n and receives apparatus information from the apparatuses 200a through 200n. The apparatus information includes apparatus identification information such as a serial number, model identification information such as a model code value, and the number of sheets output such as a counter value from one or more of the apparatuses 200a through 200n.

Note that if the apparatus information acquisition section 21 acquires the respective apparatus information from plural of the apparatuses 200a through 200n, the apparatus information acquisition section 21 searches the apparatuses 200a through 200n capable of data transmission connected to the same internal network 90 by broadcasting. Subsequently, the apparatus information acquisition section 21 transmits information acquisition requests to one or more of the apparatuses 200a through 200n that have responded to the search (one or more of the apparatuses 200a through 200n specified based on the search result are hereinafter also called "apparatus 200").

The electric power consumption computation section 22 is a functional section that computes electric power consumption of the apparatus 200 based on apparatus information acquired from the apparatus information acquisition section 21 and computational data including a TEC value. The electric power consumption computation section 22 utilizes computational data illustrated in FIG. 4 as parameters to compute electric power consumption.

FIGS. 4A and 4B are diagrams illustrating examples of the computational data according to the first embodiment. The computational data mainly include model-specific information 31 (see FIG. 4A) including model specific data such as a TEC value, and electric power consumption ratio information (see FIG. 4B) including data indicating a ratio of the electric power consumption of each day to the electric power consumption of a week.

(Model-Specific Information)

As illustrated in FIG. 4A, the model-specific information 31 includes model identification information, TEC values and IPM (image per minute) values, and the TEC values and IPM values are provided corresponding to the model identification information. Note that the IPM value indicates the number of sheets output per minute. Specifically, the IPM value indicates an output performance value for each model.

Since the computational data include such data configurations, the TEC value (disclosed electric power consumption) and the IPM value (print performance value) corresponding to each of the models may be acquired by referring to the model-specific information 31 on the basis of the model identification information contained in the apparatus information.

(Electric Power Consumption Ratio Information)

As illustrated in FIG. 4B, the electric power consumption ratio information 32 includes apparatus identification information and electric power consumption ratios, and the apparatus identification information is provided corresponding to the electric power consumption ratios. In addition, since usage frequency of the apparatus 200 largely differs between days of the week based on an operable environment of the apparatus 200 such as apparatus location or usage such as shared use or individual use, several predetermined patterns of the electric power consumption ratios are provided in advance. FIG. 4B illustrates examples of registered patterns; a pattern 1 indicates electric power consumption when the usage frequency of the apparatus 200 is high at the end of the work week, whereas a pattern 2 indicates electric power consumption when the usage frequency of the apparatus 200 is average through the work week.

Since the computational data include such data configurations, an electric power consumption value of each day of the week corresponding to each apparatus 200 may be acquired by referring to the electric power consumption ratio information 32 on the basis of the model identification information contained in the apparatus information.

Note that the above model-specific information 31 and electric power consumption ratio information 32 may be set or changed by an administrator including a user by using a predetermined tool such as a "Web-browser" or a predetermined command. In addition, the TEC value and IPM value of the model-specific information 31 may be acquired from a predetermined organization disclosing TEC value and IPM value information of corresponding apparatuses via the interface device 107 included in the electric power consumption computation device 100 to update the model-specific information 31 as desired. The computational data are kept up-to-date in this manner.

The above computational data are retained in a predetermined storage region such as a HDD contained in the electric power consumption computation device 100.

When computing electric power consumption, the electric power consumption computation section 22 accesses the computational data retention section 23 to acquire various parameter values of the apparatus 200 by referring to the model-specific information 31 and the electric power consumption ratio information 32 based on the apparatus identification information and model-specific information of the apparatus information.

The electric power consumption computation section computes an estimation value of the electric power consumption of the apparatus 200 by assigning the acquired parameter values to a predetermined computational formula, and the computed estimation value is stored in a computed data retention section 24 that is a predetermined storage region of the storage device of the electric power consumption computation device 100.

Note that specific computational processing performed by the electric power consumption computation section 22 is described in the later described functional operation.

As described above, an electric power consumption computation function according to the first embodiment operates by coordinating the above-described functions.

Specific operations (coordinated operations between the functions) of the electric power computation function according to the first embodiment are described with reference to a flowchart illustrating processing of the electric power computation function.

<Functional Operation>

The electric power consumption computation function is implemented by causing the CPU 106 to retrieve an electric power consumption computational program (software component) to be installed in the electric power consumption computation device 100 from a storage destination such as the ROM 105 into the RAM 104 and execute the following process.

Figure 5:
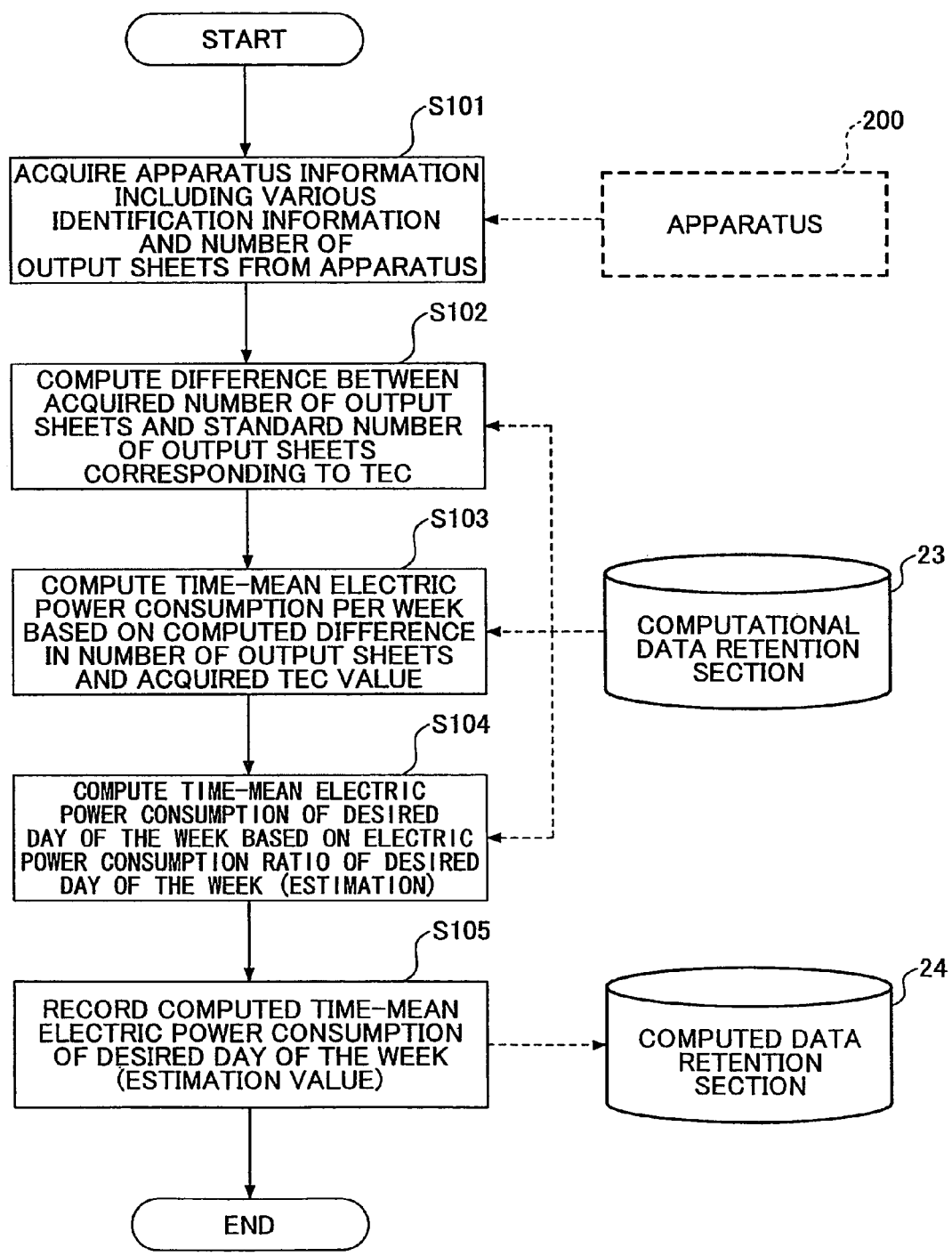
FIG. 5 is a flowchart illustrating processing example of electric power consumption computation according to the first embodiment.

FIG. 5 is a flowchart illustrating a processing example of the electric power consumption computation according to the first embodiment.

As illustrated in FIG. 5, in the electric power consumption computation device 100, the apparatus information acquisition section 21 acquires apparatus information including various identification information items such as the apparatus identification information and model identification information and the number of output sheets of the apparatus 200 (step S101). Note that the apparatus information acquisition section 21 does not simply acquire the number of output sheets but acquires the number of output sheets per week in the same manner as the TEC value.

Subsequently, in the electric power consumption computation device 100, the electric power consumption computation section 22 computes the difference between the number of output sheets acquired in step S101 (hereinafter also called "acquired number of output sheets") and the standard number of output sheets corresponding to the typical electricity consumption (TEC) (step S102). Specifically, in step S102, the standard number of output sheets corresponding to the TEC is initially computed. The standard number of output sheets corresponding to the TEC is computed based on the following equation (1).

$$\text{Standard number of output sheets corresponding to TEC} = 0.5 * (\text{IPM value} * \text{IPM value}). \quad (1)$$

Accordingly, the electric power consumption computation section 22 acquires the TEC value and IPM value corresponding to the model by referring to the model-specific information 31 retained in the computational data retention section 23 based on the apparatus identification information acquired in step S101. The electric power consumption computation section 22 computes the standard number of output sheets based on the acquired IPM value. For example, if the model is "MFP01", a corresponding IPM value is "30". As a result, the standard number of output sheets corresponding to the TEC is computed as 450 sheets.

Thus, the electric power consumption computation section 22 computes the difference between the acquired number of output sheets and the standard number of output sheets corresponding to the TEC value based on the following equation (2).

$$\text{Difference} = |\text{Standard number of output sheets corresponding to TEC} - \text{Acquired number of output sheets}| \quad (2)$$

For example, if the standard number of output sheets corresponding to the TEC is "450 sheets" and the acquired number of output sheets is "1000 sheets", the resulting difference is computed as 550 sheets.

Subsequently, in the electric power consumption computation device 100, the electric power consumption computation section 22 computes time-mean electric power consumption per week based on the computed difference in the number of output sheets between the acquired number of output sheets and the standard number of output sheets corresponding to the TEC value (hereinafter also called the "computed difference in the number of output sheets") and the TEC value acquired in step S102 (hereinafter also called the "acquired TEC value") (step S103). Initially, a running electric power value per output sheet is computed. The running electric power value per output sheet is computed based on the following equation (3).

$$\text{Running electric power value per sheet} = (\text{Running electric power value per hour}/3600) * \text{output time (sec) per sheet} \quad (3)$$

For example, if the running electric power value per hour is 1050 W, the running electric power value per second is 0.291 W. Since the MFP01 has the IPM value of "30", the output time per sheet results in 2 sec. As a result, the running electric power value per sheet is computed as 0.582 W (hereinafter also called a "computed running electric power value per sheet").

Thus, the electric power consumption computation section 22 computes the time-mean electric power consumption per week based on the following equation (4).

$$\text{Time-mean electric power consumption per week} = \text{Acquired TEC value} + \text{Computed difference in the number of output sheets} * \text{Computed running electric power value per sheet} \quad (4)$$

For example, if the model is "MFP01", a corresponding acquired TEC value is "10.1 kW/h" and the computed difference in the number of output sheets results in 550 sheets. As a result, if the computed running electric power value per sheet is 0.582 W, the time-mean electric power consumption per week is computed as approximately 10.4201 kW/h (hereinafter also called a "computed time-mean electric power consumption per week").

Subsequently, in the electric power consumption computation device 100, the electric power consumption computation section 22 computes time-mean electric power consumption of a desired day of the week (estimation value) based on the electric power consumption ratio of the desired day of the week (step S104). Thus, the electric power consumption computation section 22 computes the time-mean electric power consumption of the desired day of the week based on the following equation (5).

$$\text{Time-mean electric power consumption of a desired day of the week (Estimation value)} = \text{Computed time-mean electric power consumption per week} * \text{Electric power consumption ratio of the desired day of the week} \quad (5)$$

Accordingly, the electric power consumption computation section 22 specifies a pattern of registered electric power consumption ratios by referring to the electric power consumption ratio information 32 retained in the computational data retention section 23 based on the apparatus identification information acquired in step S101. Subsequently, the electric power consumption computation section 22 acquires a value of one of the registered electric power consumption ratios corresponding to a desired day of the week. The electric power consumption computation section 22 thus computes the time-mean electric power consumption of the desired day of the week based on the computed time-mean electric power consumption per week obtained in step S103.

For example, if the apparatus is "M1" and a desired day of the week is "Monday", the electric power consumption computation section 22 specifies a pattern 1 for the apparatus M1, and a corresponding electric power consumption ratio of Monday is "20%". Accordingly, the electric power consumption computation section 22 computes the time-mean electric power consumption of the desired day (i.e., Monday) of approximately 2.084 kW/h.

Subsequently, in the electric power consumption computation device 100, the electric power consumption computation section 22 records the computed time-mean electric power consumption of the desired day of the week as computed data in the computed data retention section 24 (step S105).

As described above, in the electric power consumption computation device 100, electric power consumption is estimated based on the TEC value of the apparatus 200.

The electric power consumption (estimation value) of the apparatus 200 obtained by the above computational procedure may be used for computation of carbon dioxide ($CO_2$) emissions and energy costs. Thus, the electric power consumption (estimation value) of the apparatus 200 obtained by the above computational procedure may be used for analyzing reduction of environmental burdens or cost.

<Another Operations Environment>

Figure 6:
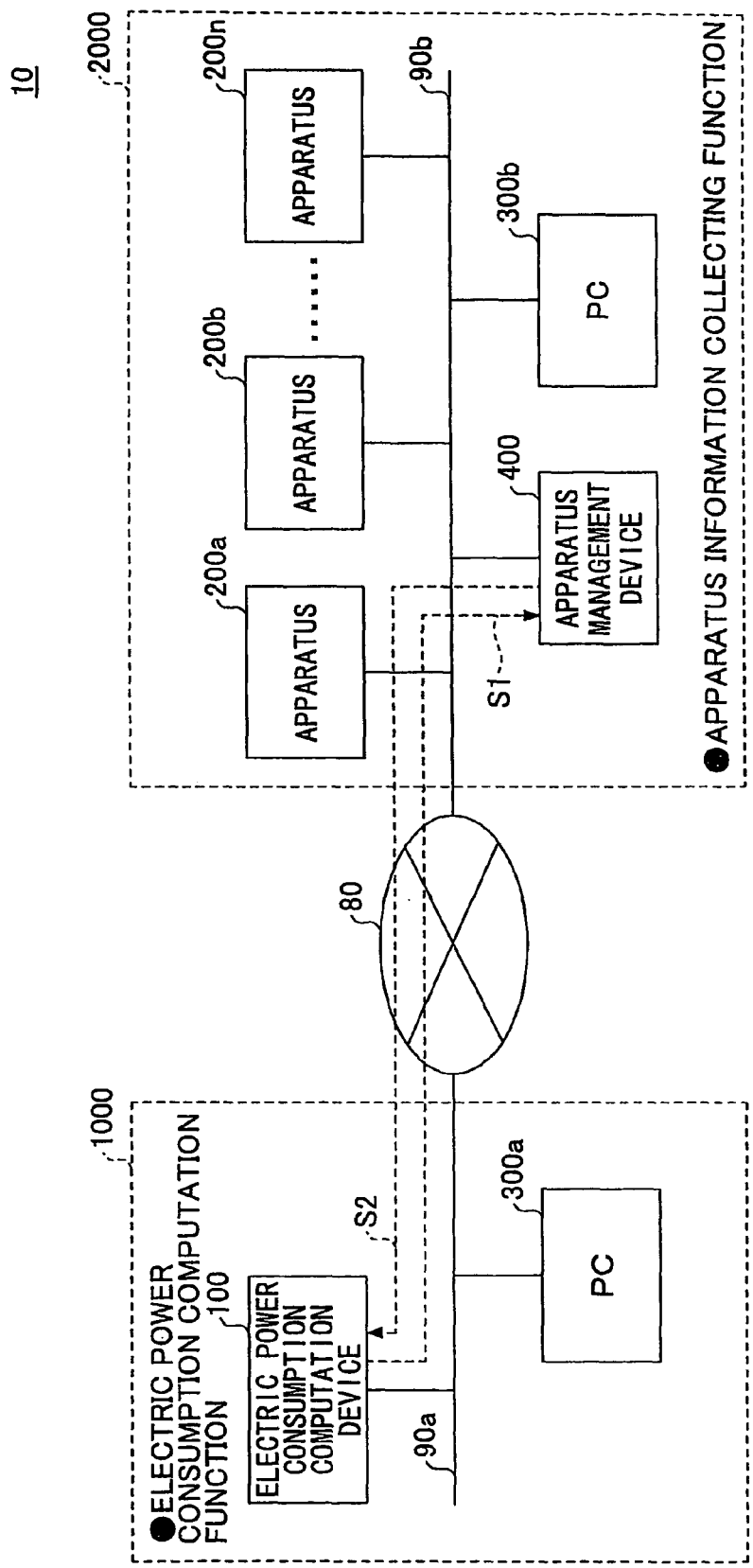
FIG. 6 is a diagram illustrating a second operations environment example of the electric power consumption computation-device according to the first embodiment.

The above estimation value may be used for another operations environment as illustrated in FIG. 6, in addition to the operations environment illustrated in FIG. 1.

FIG. 6 is a diagram illustrating a second example of operations environment of an electric power consumption computation device 100 according to the first embodiment. FIG. 6 illustrates an example of a system 10 for monitoring the status of the apparatus 200 (hereinafter referred to as a "remote monitoring system").

The remote monitoring system 10 includes a apparatus analysis system 1000 provided at a manufacturer side, a device manager system 2000 provided at a user side (company side), and an external network 80 such as the Internet via which the apparatus analysis system 1000 and the device manager system 2000 are mutually connected.

The apparatus analysis system 1000 includes the electric power consumption computation device 100, one or more personal computers PCs 300a, and an internal network 90a via which the electric power consumption computation device 100 and PCs 300a are connected.

The device manager system 2000 includes one or more apparatuses 200a through 200n, an apparatus management device (device management server) 400 that monitors and manages the apparatuses 200a through 200n, one or more PCs 300b, and an internal network 90b via which the apparatuses 200a through 200n, the apparatus management device 400, and the PCs 300b are connected. The apparatus management device 400 in the above environment periodically acquires apparatus information from the apparatuses 200a through 200n according to a predetermined monitoring interval.

The internal network 90a of the apparatus analysis system 1000 and the internal network 90b of the device manager system 2000 are connected to the external network 80 via firewalls.

Accordingly, in the remote monitoring system 10 having the above configuration, the electric power consumption computation device 100 of the apparatus analysis system 1000 can acquire the apparatus information of the apparatuses 200a through 200n from the apparatus management device 400 of the device manager system 2000 via the external network 80.

Specifically, the apparatus information acquisition section 21 of the electric power consumption computation device 100 transmits an apparatus information acquisition request to the apparatus management device 400 via the external network 80 (S1). In response to the apparatus information acquisition request, the apparatus management device 400 transmits the apparatus information acquired from each of the apparatuses 200a through 200n to the apparatus information acquisition section 21 (requester) (S2). In the electric power consumption computation device 100, the electric power consumption computation section 22 computes electric power consumption of each of the apparatuses 200a through 200n based on the acquired apparatus information.

Accordingly, the apparatus analysis system 1000 computes $CO_2$ emissions and energy costs and analyses reduction of environmental burdens or cost reduction based on the resulting electric power consumption of each of the apparatuses 200a through 200n.

As described above, with this configuration, the electric power consumption computation device 100 according to the first embodiment transmits the apparatus information acquisition request to the apparatus management device 400 and acquires the apparatus information from the apparatus management device 400. Note that the method in which the electric power consumption computation device 100 according to the first embodiment acquires the apparatus information is not limited to the above-described manner. For example, the apparatus management device 400 may actively transmit the apparatus information without causing the electric power consumption computation device 100 to transmit the apparatus information acquisition request to the apparatus management device 400.

<Overview>

As described above, in the electric power consumption computation device 100 according to the first embodiment, the apparatus information acquisition section 21 acquires the apparatus information of the apparatuses 200a through 200n. In addition, in the electric power consumption computation device 100 according to the first embodiment, the electric power consumption computation section 22 computes the electric power consumption of each of the apparatuses 200a through 200n of the desired day of the week based on the TEC values of the apparatuses 200a through 200n per week (time-mean electric power consumption per week) and the number of sheets printed by the apparatuses 200a through 200n per week, respectively.

With this configuration, the electric power consumption computation device 100 can acquire electric power consumption of each of the apparatuses 200a through 200n without using an electric power meter.

Second Embodiment

An electric power consumption computation device 100 according to a second embodiment is configured such that a TEC value of each of the apparatuses 200a through 200n is estimated.

The TEC values of the apparatuses 200a through 200n vary with a corresponding manufacturing year of the apparatuses 200a through 200n. Accordingly, TEC values of the apparatuses having an old manufacturing year may not be disclosed.

Accordingly, in the second embodiment, the TEC value of an old apparatus having an old manufacturing year may be estimated based on a TEC value of an apparatus having the latest manufacturing year, and electric power consumption of the old apparatus is computed based on the estimated TEC value.

The electric power consumption computation device 100 according to the second embodiment having a function to estimate a TEC value is described below. Note that in the electric power consumption computation device 100 according to the second embodiment, same reference numerals are provided with components identical to those of the electric power consumption computation device 100 according to the first embodiment, and their descriptions are omitted.

<Electric Power Consumption Computational Function>

An electric power consumption computation section 22 of the electric power consumption computation device 100 according to the second embodiment includes a function that differs from the electric power consumption computation section 22 of the electric power consumption computation device 100 according to the first embodiment.

<Functional Configuration>

Figure 7:
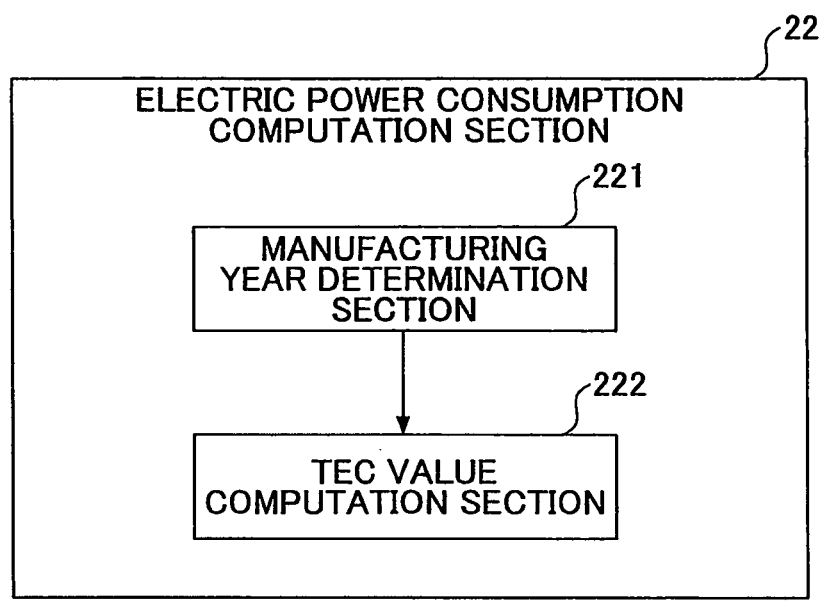
FIG. 7 is a diagram illustrating a functional configuration example of an electric power consumption computation section according to a second embodiment.

FIG. 7 is a diagram illustrating a functional configuration example of the electric power consumption computation device 22 according to the second embodiment.

As illustrated in FIG. 7, the electric power consumption computation device 22 according to the second embodiment includes a manufacturing year determination section 221 and a TEC value computation section 222.

The manufacturing year determination section 221 determines whether the manufacturing year of a desired one of the apparatus 200a through 200n (hereinafter called the "apparatus 200") matches the latest manufacturing year of the apparatus 200. Thus, the manufacturing year determination section 221 counts the number of years back from the latest manufacturing year to the manufacturing year of the apparatus 200 based on information indicating the manufacturing year of the apparatus 200 (hereinafter also called "manufacturing year information") that is contained in apparatus information acquired by the apparatus information acquisition section 21. For example, if the latest manufacturing year is 2008 and the manufacturing year information of the acquired apparatus information of the apparatus 200 is 2003, the manufacturing year determination section 221 specifies that the apparatus 200 has been manufactured five years ago (i.e., the apparatus 200 has a 5-year old manufacturing year).

Accordingly, if the specified manufacturing year is a manufacturing year of one or more years ago, the manufacturing year determination section 221 determines that the specified manufacturing year does not match the latest manufacturing year, and transmits an estimation request to the TEC value computation section 222 in order to specify a TEC value corresponding to the specified manufacturing year.

On receiving the estimation request, the TEC value computation section 222 estimates a TEC value corresponding to the specified manufacturing year using a predetermined formula based on the manufacturing year of N years ago specified by the manufacturing year determination section 221 and average annual consumption improvement efficiency.

In the second embodiment, the TEC value computation section 222 estimates the TEC value corresponding to the specified manufacturing year based on the consumption improvement efficiency obtained from energy-conservation related information (e.g., "various types of information disclosed in energy-conservation related regulations"). For example, if the energy-conservation related information discloses the consumption improvement efficiency of "40% in six years", average annual consumption improvement efficiency is approximately 6.7%.

The TEC value computation section 222 estimates the TEC value of the manufacturing year of the apparatus 200 based on the consumption improvement efficiency corresponding to the manufacturing year of the apparatus 200. Thus, the TEC value computation section 222 computes the number of years (N years) by counting the number of years back from the latest manufacturing year to the manufacturing year of the apparatus 200.

The TEC value computation section 222 computes the consumption improvement efficiency of the manufacturing year of N years ago using the following formula [1+N*0.067], by assigning the consumption improvement efficiency of the latest manufacturing year to 1. The computed value indicates an incremental coefficient for computing a TEC value corresponding to the manufacturing year of N years going back from the latest manufacturing year based on the TEC value corresponding to the latest manufacturing year.

The TEC value computation section 222 computes the TEC value corresponding to the manufacturing year of the apparatus 200 by multiplying the TEC value of the latest manufacturing year by the computed incremental coefficient.

For example, when a TEC value corresponding to the latest manufacturing year 2008 is 10.1 kW/h and the apparatus 200 is the model "MFP01" manufactured in 2003, a TEC value corresponding to the manufacturing year 2003 of the apparatus 200 is computed as approximately 13.484 (=10.1*(1+(5*0.067))).

Thus, since the above functions of the electric power consumption computation section 22 operate in coordination with one another, the electric power consumption computation section 22 according to the second embodiment estimates a TEC value of a corresponding manufacturing year, and computes electric power consumption (estimation value) of the apparatus 200 based on the estimated TEC value.

Specific operations (coordinated operations between the functions) of the electric power computation function according to the first embodiment, including the above-described computation of the TEC value corresponding to the manufacturing year, are described with reference to a flowchart illustrating processing of the electric power computation function.

<Functional Operation>

The electric power consumption computation function is implemented by causing the CPU 106 to retrieve an electric power consumption computational program (software component) to be installed in the electric power consumption computation device from a storage destination such as a ROM 105 into the RAM 104 and execute the following process.

Figure 8:
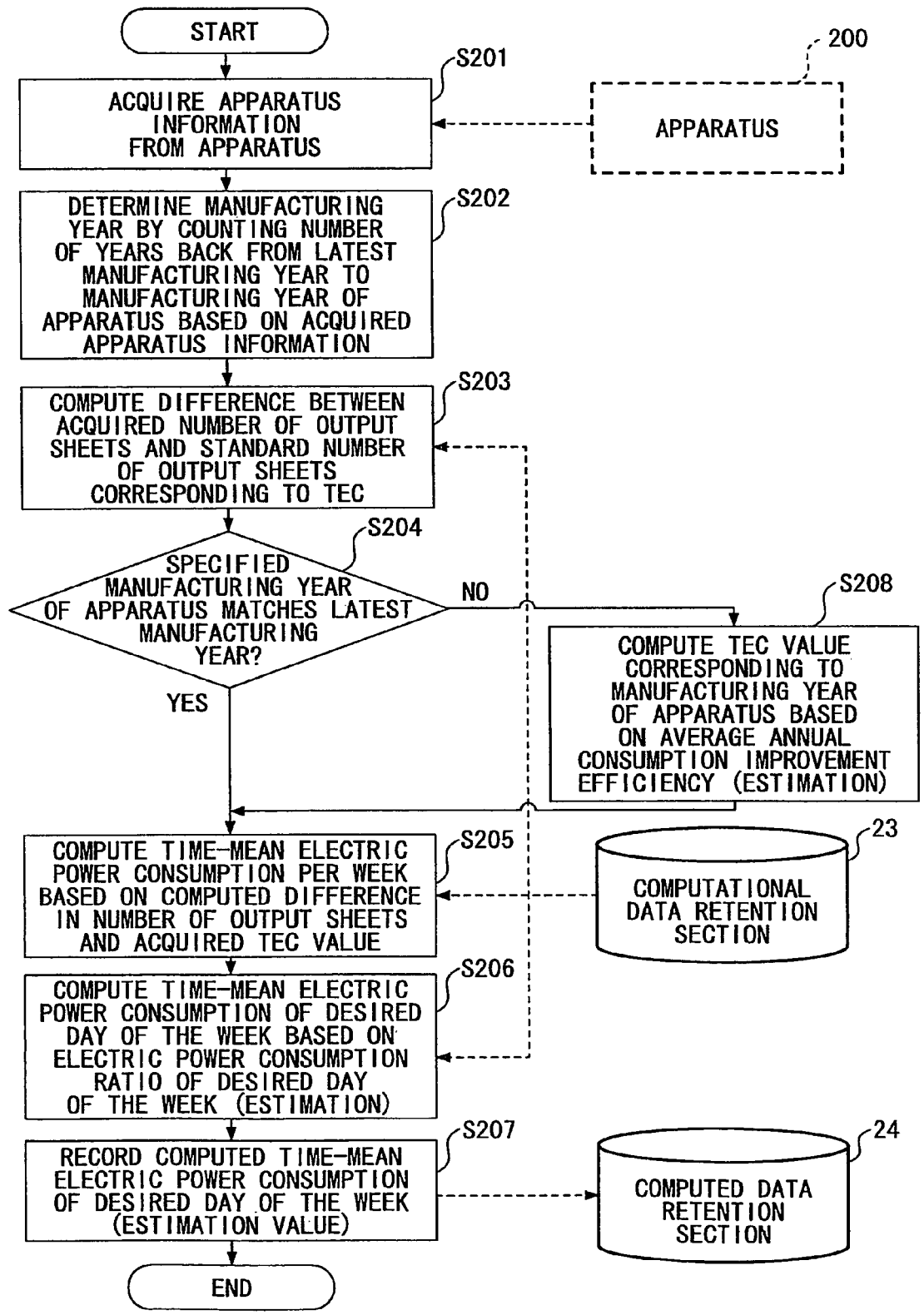
FIG. 8 is a flowchart illustrating processing example of electric power consumption computation according to the second embodiment.

FIG. 8 is a flowchart illustrating a processing example of the electric power consumption computation according to the second embodiment.

As illustrated in FIG. 8, in the electric power consumption computation device 100, the apparatus information acquisition section 21 acquires apparatus information including various identification information items such as the apparatus identification information and model identification information and the number of output sheets of the apparatus 200 (step S201). Note that the apparatus information acquisition section 21 does not simply acquire the number of output sheets but acquires the number of output sheets per week in the same manner as the TEC value.

Subsequently, in the electric power consumption computation device 100, the manufacturing year determination section 221 of the electric power consumption computation section 22 counts the number of years back from the latest manufacturing year to the manufacturing year of the apparatus 200 based on the manufacturing year information of the apparatus 200 contained in the apparatus information acquired in step S201. That is, the manufacturing year determination section 221 specifies the manufacturing year of the apparatus 200 (step S202).

Subsequently, in the electric power consumption computation device 100, the electric power consumption computation section 22 computes the difference between the number of output sheets acquired in step S201 (hereinafter also called "acquired number of output sheets") and the standard number of output sheets corresponding to the TEC (step S203). Initially, the standard number of output sheets corresponding to the TEC is computed. The standard number of output sheets corresponding to the TEC is computed based on the following equation (1).

$$\text{Standard number of output sheets corresponding to TEC} = 0.5*(\text{IPM value}*\text{IPM value}) \quad (1)$$

Accordingly, the electric power consumption computation section 22 acquires the TEC value and IPM value corresponding to the model by referring to the model-specific information 31 retained in the computational data retention section 23 based on the apparatus identification information acquired in step S201. The electric power consumption computation section 22 computes the standard number of output sheets based on the acquired IPM value. For example, if the model is "MFP01", a corresponding IPM value is "30", and as a result, the standard number of output sheets corresponding to the TEC is computed as 450 sheets.

Thus, the electric power consumption computation section 22 computes the difference between the acquired number of output sheets and the standard number of output sheets corresponding to the TEC value based on the following equation (2).

$$\text{Difference}=|\text{Standard number of output sheets corresponding to TEC}-\text{Acquired number of output sheets}| \quad (2)$$

For example, if the standard number of output sheets corresponding to the TEC value is "450 sheets" and the acquired number of output sheets is "1000 sheets", the resulting difference is computed as 550 sheets.

Subsequently, in the electric power consumption computation device 100, the manufacturing year determination section 221 of the electric power consumption computation section 22 determines whether the manufacturing year of the apparatus 200 specified in step S202 matches the latest manufacturing year (step S204).

In step S204, if the specified manufacturing year of the apparatus 200 matches the latest manufacturing year (i.e., YES in step S204), the electric power consumption computation section 22 of the electric power consumption computation device 100 computes time-mean electric power consumption per week based on the computed difference in the number of output sheets and the acquired TEC value in step S203 (step S205). Specifically, a running electric power value per output sheet is initially computed. The running electric power value per output sheet is computed based on the following equation (3).

$$\text{Running electric power value per sheet}=(\text{Running electric power value per hour}/3600)*\text{output time (sec) per sheet} \quad (3)$$

For example, if the running electric power value per hour is 1050 W, the running electric power value per second is 0.291 W. Since the MFP01 has the IPM value of "30", the output time per sheet results in 2 sec. As a result, the running electric power value per sheet is computed as 0.582 W (hereinafter also called a "computed running electric power value per sheet").

Thus, the electric power consumption computation section 22 computes the time-mean electric power consumption per week based on the following equation (4).

$$\text{Time-mean electric power consumption per week}=\text{Acquired TEC value}+\text{Computed difference in the number of output sheets}*\text{Computed running electric power value per sheet} \quad (4)$$

For example, if the model is "MFP01", a corresponding acquired TEC value is "10.1 kW/h" and the computed difference in the number of output sheets results in 550 sheets. As a result, if the computed running electric power value per sheet is 0.582 W, the time-mean electric power consumption per week is computed as approximately 10.4201 kW/h (hereinafter also called a "computed time-mean electric power consumption per week").

Subsequently, in the electric power consumption computation device 100, the electric power consumption computation section 22 computes time-mean electric power consumption of a desired day of the week (estimation value) based on the electric power consumption ratio of the desired day of the week (step S206). Thus, the electric power consumption computation section 22 computes the time-mean electric power consumption of the desired day of the week based on the following equation (5).

$$\text{Time-mean electric power consumption of the desired day of the week (Estimation value)}=\text{Computed time-mean electric power consumption per week}*\text{Electric power consumption ratio of the desired day of the week} \quad (5)$$

Accordingly, the electric power consumption computation section 22 specifies a pattern of registered electric power consumption ratios by referring to the electric power consumption ratio information 32 retained in the computational data retention section 23 based on the apparatus identification information acquired in step S201. Subsequently, the electric power consumption computation section 22 acquires a value of one of the registered electric power consumption ratios corresponding to a desired day of the week. The electric power consumption computation section 22 thus computes the time-mean electric power consumption of the desired day of the week based on the computed time-mean electric power consumption per week obtained in step S205.

For example, if the apparatus is "M1" and the desired day of the week is "Monday", the electric power consumption computation section 22 specifies a pattern 1 for the apparatus M1, and a corresponding electric power consumption ratio of Monday is "20%". Accordingly, the electric power consumption computation section 22 computes the time-mean electric power consumption of the desired day of approximately 2.084 kW/h.

Subsequently, in the electric power consumption computation device 100, the electric power consumption computation section 22 records the computed time-mean electric power consumption of the desired day of the week as computed data in the computed data retention section 24 (step S207).

Meanwhile, in step S204, if the specified manufacturing year of the apparatus 200 does not match the latest manufacturing year (i.e., NO in step S204), the TEC value computation section 222 of the electric power consumption computation section 22 in the electric power consumption computation device 100 computes a TEC value corresponding to the manufacturing year of the apparatus 200 based on the manufacturing year of N years ago specified in step S204 (hereinafter also called "specified manufacturing year") and average annual consumption improvement efficiency (step S208). The TEC value computation section 222 computes the TEC value corresponding to the manufacturing year based on the following equation (6).

$$\text{TEC value corresponding to manufacturing year}=\text{TEC value corresponding to the latest manufacturing year}*(1+(N*0.067)) \quad (6)$$

In equation (6), "TEC value corresponding to the latest manufacturing year" indicates the latest ENERGY STAR registered value. "N" in equation 6 represents the manufacturing year of N years ago specified by the manufacturing year determination section 221.

For example, if the latest manufacturing year is 2008, and the manufacturing year of the apparatus 200 is 2003, which is five years back from the latest manufacturing year, the TEC value of 1.335 is computed based on the above equation 6. The computed value indicates an incremental coefficient for computing the TEC value corresponding to the manufacturing year of N years going back from the latest manufacturing year based on the TEC value corresponding to the latest manufacturing year.

Thus, the TEC value computation section 222 computes the TEC value corresponding to the manufacturing year of the apparatus 200 by multiplying the TEC value of the latest manufacturing year by the computed incremental coefficient.

For example, when the apparatus 200 is the model "MFP01" manufactured in 2003, and a TEC value corresponding to the latest manufacturing year 2008 of the apparatus 200 is 10.1 kW/h, a TEC value corresponding to the manufacturing year 2003 of the apparatus 200 is computed as approximately 13.484 kW/h.

The computed TEC value (estimation value) is used in a process of step S205.

As described above, in the electric power consumption computation device 100, the TEC value is estimated corresponding to the manufacturing year of the apparatus 200, and electric power consumption is estimated based on the estimated TEC value of the apparatus 200.

<Overview>

As described above, in the electric power consumption computation device 100 according to the second embodiment, the apparatus information acquisition section 21 acquires the apparatus information of the apparatuses 200. Subsequently, in the electric power consumption computation device 100 according to the second embodiment, the manufacturing year determination section 221 of the electric power consumption computation section 22 specifies the manufacturing year of the apparatus 200, and determines whether the manufacturing year of the apparatus 200 is the latest manufacturing year. In the electric power consumption computation device 100, if the manufacturing year of the apparatus 200 is not the latest manufacturing year, the TEC value computation section 222 computes a TEC value (estimation value) corresponding to the manufacturing year of the apparatus 200 based on the specified manufacturing year of the apparatus 200.

As a result, in the electric power consumption computation device 100 according to the second embodiment, the electric power consumption computation section 22 computes the electric power consumption of the apparatus 200 of the desired day of the week based on the TEC value of the apparatus 200 (time-mean electric power consumption per week) and the number of sheets printed by the apparatus 200 per week.

With this configuration, the electric power consumption computation device 100 can acquire electric power consumption of the apparatus 200 without using an electric power meter. Further, even if the apparatus 200 is an old model, the electric power consumption computation device 100 can estimate the TEC value corresponding to the manufacturing year of the apparatus 200, and acquire electric power consumption of the apparatus 200 based on the estimated TEC value.

So far, the first and second embodiments are described; however, the above-described electric power consumption computation function according to the embodiments can be implemented by causing the CPU 106 to execute a computer program composed of the steps illustrated in the figures which is encoded in a programming language adapted to an operating environment (platform) of the electric power consumption computation device 100.

Such a computer program may be stored in a computer-readable recording medium 103a. Examples of such a computer-readable recording medium 103a include a floppy (registered trademark) disk, a compact disk (CD), a digital versatile disk (DVD), a SD memory card, and a universal serial bus (USB) memory.

The computer program can be installed in the electric power consumption computation device 100 via the drive device 103 that can read the recording medium 103a. Further, since the electric power consumption computation device 100 includes the interface device 107, the above computer program may be downloaded via a telecommunications line and installed in the electric power consumption computation device 100.

Note that the above embodiments have described examples of the configuration of the electric power consumption computation device in that the TEC value can be acquired from the computational data retention section 23 based on the model identification information; however, the configuration is not limited thereto. For example, the electric power consumption computation device may be configured such that the electric power consumption computation device initially determines whether the apparatus information acquired from the apparatus 200 contains the TEC value and if the apparatus 200 contains the TEC value, the electric power consumption computation device compute the electric power consumption based on the TEC value contained in the apparatus information. If the apparatus 200 does not contain the TEC value, the electric power consumption computation device may be configured to acquire the TEC value from the computational data retention section 23 and computes the electric power consumption based on the TEC value acquired from the computational data retention section 23.

With this configuration, the electric power consumption computation device computes the electric power consumption of the apparatus of the desired day of the week based on the TEC value of the apparatus and the number of sheets printed by the apparatus per week.

Accordingly, the electric power consumption computation device according to the embodiments can compute the electric power consumption of the apparatus, and as a result, the electric power consumption computation device can acquire the electric power consumption of the apparatus without using an electric power meter.

With these configurations and procedures, the electric power consumption computation device can realize an operation that computes the electric power consumption of the apparatus of the desired day of the week based on the TEC value of the apparatus and the number of sheets printed by the apparatus per week.

The method for computing electric power consumption according to the embodiments may provide an environment in which the electric power consumption of the apparatus can be acquired without using an electric power meter.

The above embodiments may provide the device, the method, and the computer-readable recording medium having the computer program of computing electric power consumption, in which the electric power consumption of the apparatus is estimated based on the TEC value of the apparatus.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

This patent application is based on Japanese Priority Patent Application No. 2009-062051 filed on Mar. 13, 2009, the entire contents of which are hereby incorporated herein by reference.

What is claimed is:

1. An electric power consumption computation device comprising:
   a memory; and
   a processor configured to,
      acquire a Typical Electricity Consumption (TEC) value of an apparatus from a source having TEC values for a plurality of apparatuses stored therein, the source being one of the memory and an external device,
      acquire, from the apparatus, information indicating a number of output sheets that have been output by the apparatus within a period of time,
      determine a standard number of output sheets corresponding to the acquired TEC value, the standard number of output sheets being based on an image per minute (IPM) value of a model associated with the apparatus,
      compute electric power consumption of the apparatus based on the acquired TEC value and a difference between the acquired number of output sheets and the standard number of output sheets corresponding to the acquired TEC value such that the computed electric power consumption of the apparatus is determined without utilizing a power meter to measure electric power consumption, and
      display, on a display, the computed electric power consumption of the apparatus, wherein
      at least one of the TEC values are computed based on an average annual consumption improvement efficiency.

2. The electric power consumption computation device as claimed in claim 1, wherein the processor is configured to,
   compute a first electric power consumption corresponding to the difference, and
   compute the electric power consumption of the apparatus based on the first electric power consumption and the TEC value of the apparatus.

3. The electric power consumption computation device as claimed in claim 2, wherein the processor is configured to,
   acquire the image per minute (IPM) value of the apparatus, and
   compute the first electric power consumption based on the difference and running electric power value per sheet.

4. The electric power consumption computation device as claimed in claim 3, wherein the period of time is one week.

5. The electric power consumption computation device as claimed in claim 1, wherein
   the processor is configured to acquire the image per minute (IPM) value of the apparatus,
   the standard number of output sheets corresponding to the acquired TEC value is computed based on the acquired IPM value, and
   a first electric power consumption is computed based on the acquired IPM value.

6. The electric power consumption computation device as claimed in claim 5, wherein the processor is configured to,
   acquire a model identification information of the apparatus,
   acquire the TEC value of the apparatus based on the acquired model identification information,
   store TEC values associated with the model identification information of each of the plurality of apparatuses,
   acquire the IPM value of the apparatus based on the acquired model identification information, and
   store IPM values associated with the model identification information of each of the plurality of apparatuses.

7. A method for computing electric power consumption performed on one or more computation devices having a memory and a processor, the method comprising:
   acquiring, via the processor, a Typical Electricity Consumption (TEC) value of an apparatus from a source having TEC values for a plurality of apparatuses stored therein, the source being one of the memory and an external device;
   acquiring, via the processor, information from the apparatus, the information indicating a number of output sheets that have been output by the apparatus within a period of time;
   determining, via the processor, a standard number of output sheets corresponding to the acquired TEC value, the standard number of output sheets being based on an image per minute (IPM) value of a model associated with the apparatus;
   computing, via the processor, electric power consumption of the apparatus based on the acquired TEC value and a difference between the acquired number of output sheets and the standard number of output sheets corresponding to the acquired TEC value such that the computed electric power consumption of the apparatus is determined without utilizing a power meter to measure electric power consumption; and
   displaying, via the processor, the computed electric power consumption of the apparatus on a display, wherein
      at least one of the TEC values are computed based on an average annual consumption improvement efficiency.

8. The method as claimed in claim 7, wherein
   the computing computes a first electric power consumption corresponding to the difference and computes the electric power consumption of the apparatus based on the first electric power consumption and the TEC value of the apparatus.

9. The method as claimed in claim 8, further comprising:
   acquiring the image per minute (IPM) value of the apparatus, wherein
      the computing computes the first electric power consumption based on the difference and running electric power value per sheet.

10. The method as claimed in claim 9, wherein the period of time is one week.

11. The method as claimed in claim 7, further comprising:
    acquiring the image per minute (IPM) value of the apparatus, wherein
       the standard number of output sheets corresponding to the acquired TEC value is computed based on the acquired IPM value, and
       a first electric power consumption is computed based on the acquired IPM value.

12. The method as claimed in claim 11, wherein
    the acquiring the image per minute (IPM) value acquires a model identification information of the apparatus,
    the acquiring the TEC value acquires the TEC value of the apparatus based on the acquired model identification information, and the processor is configured to,
store TEC values associated with the model identification information of each of the plurality of apparatuses,
acquire the IPM value of the apparatus based on the acquired model identification information, and
store IPM values associated with the model identification information of each of the plurality of apparatuses.

13. A non-transitory computer-readable recording medium containing a computer program for causing a computer to execute a function for computing electric power consumption performed on one or more computation devices having a memory and a processor, the function comprising:
acquiring, via the processor, a Typical Electricity Consumption (TEC) value of an apparatus from a source having TEC values for a plurality of apparatuses stored therein, the source being one of the memory and an external device;
acquiring, via the processor, information from the apparatus, the information indicating a number of output sheets that have been output by the apparatus within a period of time;
determining, via the processor, a standard number of output sheets corresponding to the acquired TEC value, the standard number of output sheets being based on an image per minute (IPM) value of a model associated with the apparatus;
computing, via the processor, electric power consumption of the apparatus based on the acquired TEC value and a difference between the acquired number of output sheets and the standard number of output sheets corresponding to the acquired TEC value such that the computed electric power consumption of the apparatus is determined without utilizing a power meter to measure electric power consumption; and
displaying, via the processor, the computed electric power consumption of the apparatus on a display, wherein
at least one of the TEC values are computed based on an average annual consumption improvement efficiency.

14. The non-transitory computer-readable recording medium as claimed in claim 13, wherein
the computing computes a first electric power consumption corresponding to the difference and computes the electric power consumption of the apparatus based on the first electric power consumption and the TEC value of the apparatus.

15. The non-transitory computer-readable recording medium as claimed in claim 14, further comprising:
acquiring the IPM value of the apparatus, wherein
the computing computes the first electric power consumption based on the difference and running electric power value per sheet.

16. The non-transitory computer-readable recording medium as claimed in claim 15, wherein the period of time is one week.

17. The non-transitory computer-readable recording medium as claimed in claim 13, further comprising:
acquiring the image per minute (IPM) value of the apparatus, wherein
the standard number of output sheets corresponding to the acquired TEC value is computed based on the acquired IPM value, and
a first electric power consumption is computed based on the acquired IPM value.

18. The non-transitory computer-readable recording medium as claimed in claim 17, wherein
the acquiring the image per minute (IPM) value acquires a model identification information of the apparatus,
the acquiring the TEC value acquires the TEC value of the apparatus based on the acquired model identification information, and the processor is configured to,
store TEC values associated with the model identification information of each of the plurality of apparatuses,
acquire the IPM value of the apparatus based on the acquired model identification information, and
store IPM values associated with the model identification information of each of the plurality of apparatuses.

* * * * *

UNITED STATES PATENT AND TRADEMARK OFFICE
CERTIFICATE OF CORRECTION

PATENT NO. : 9,494,990 B2  
APPLICATION NO. : 12/659108  
DATED : November 15, 2016  
INVENTOR(S) : Jun Murata Page 1 of 1

It is certified that error appears in the above-identified patent and that said Letters Patent is hereby corrected as shown below:

On the Title Page

Item (73) should read:  
-- (73) Assignee: Ricoh Company, Ltd., Tokyo (JP) --

Signed and Sealed this  
Eighteenth Day of April, 2017

Michelle K. Lee  
*Director of the United States Patent and Trademark Office*